United States Patent
Mathai et al.

(10) Patent No.: US 8,766,729 B2
(45) Date of Patent: Jul. 1, 2014

(54) APPARATUS, AND ASSOCIATED METHOD, FOR FORMING A SYNTHESIZED OSCILLATING SIGNAL

(75) Inventors: Nebu John Mathai, Waterloo (CA); Stephen Arnold Devison, Kitchener (CA); Oleksiy Kravets, Petersburg (CA)

(73) Assignee: BlackBerry Limited, Waterloo (CA)

( * ) Notice: Subject to any disclaimer, the term of this patent is extended or adjusted under 35 U.S.C. 154(b) by 72 days.

(21) Appl. No.: 13/253,170

(22) Filed: Oct. 5, 2011

(65) Prior Publication Data
US 2013/0088303 A1  Apr. 11, 2013

(51) Int. Cl.
*H03L 7/00* (2006.01)
(52) U.S. Cl.
USPC ............... 331/1 A; 331/16; 327/105; 327/159
(58) Field of Classification Search
CPC ......................................................... H03L 7/00
USPC .............. 331/45, 16, 1 A; 327/156, 105, 106, 327/107, 159; 332/103; 708/270
See application file for complete search history.

(56) References Cited

U.S. PATENT DOCUMENTS

| | | | |
|---|---|---|---|
| 4,285,044 A | | 8/1981 | Thomas et al. |
| 5,182,528 A | * | 1/1993 | Zuta ............................... 331/1 A |
| 5,349,309 A | * | 9/1994 | Fujii ................................ 331/17 |
| 5,892,692 A | * | 4/1999 | Whikehart et al. ............ 708/272 |
| 6,310,513 B1 | * | 10/2001 | Iemura ........................... 329/304 |
| 7,164,735 B2 | * | 1/2007 | Gierl et al. ..................... 375/327 |
| 7,667,511 B2 | * | 2/2010 | Staszewski et al. ............ 327/172 |
| 2003/0155983 A1 | | 8/2003 | Royle |
| 2009/0006514 A1 | | 1/2009 | Kountouris |

* cited by examiner

*Primary Examiner* — Arnold Kinkead

(57) ABSTRACT

An apparatus, and an associated method, for synthesizing a discrete-valued oscillating signal. Input parameters are provided that are determinative of the frequency, gain, and phase characteristics of the resultant, oscillating signal. The discrete-valued, oscillating signal is combinable with another signal to form a mixed signal of a desired frequency, gain, and phase characteristic using a single complex multiplication operation.

19 Claims, 3 Drawing Sheets

APPARATUS, AND ASSOCIATED METHOD, FOR FORMING A SYNTHESIZED OSCILLATING SIGNAL

The present disclosure relates generally to a manner by which to synthesize an oscillating signal having a selectable frequency, gain, or phase characteristic. More particularly, the present disclosure relates to an apparatus, and an associated method, for synthesizing the oscillating signal and for mixing the synthesized, oscillating signal with an information signal.

BACKGROUND

Many varied communication devices are available by which to carry out a wide variety of communication services. And, with continued advancements in technology, additional communication devices and services shall likely be developed.

Information may be required to be communicated only a very short distance, such as between elements within a single computer or over very large distances, sometimes many miles or even greater distances. Information is communicated over a communication channel that is formed to extend between communication devices that send and receive the information. In wireline communication systems, the communication channel is defined upon a physical, i.e., wired, connection extending between the locations. In radio communication systems, the communication channel forms a radio communication channel, and the information is communicated as part of an electromagnetic signal that is communicated by way of a radio connection defined by the radio channel. And, some communication systems utilize both radio channels and physical channels during different stages of the communication of the information.

A cellular communication system is an exemplary communication system that utilizes radio channels in the communication of information. Other radio communication systems, e.g., WiFi, WiMax, Bluetooth, and other analogous systems also utilize radio channels upon which to communicate information.

To communicate information over any more than very short distances, the information is typically modulated, usually by combining the information with a carrier signal. The resultant, modulated signal is demodulated, once communicated and received at a destination, to recover the information.

Conventional modulation and demodulation mechanisms and techniques are generally inflexible. An improvement to the existing art would therefore be advantageous.

It is in light of this background information related to communication of information that the significant improvements of the present disclosure have evolved.

DETAILED DESCRIPTION

Figure 1:
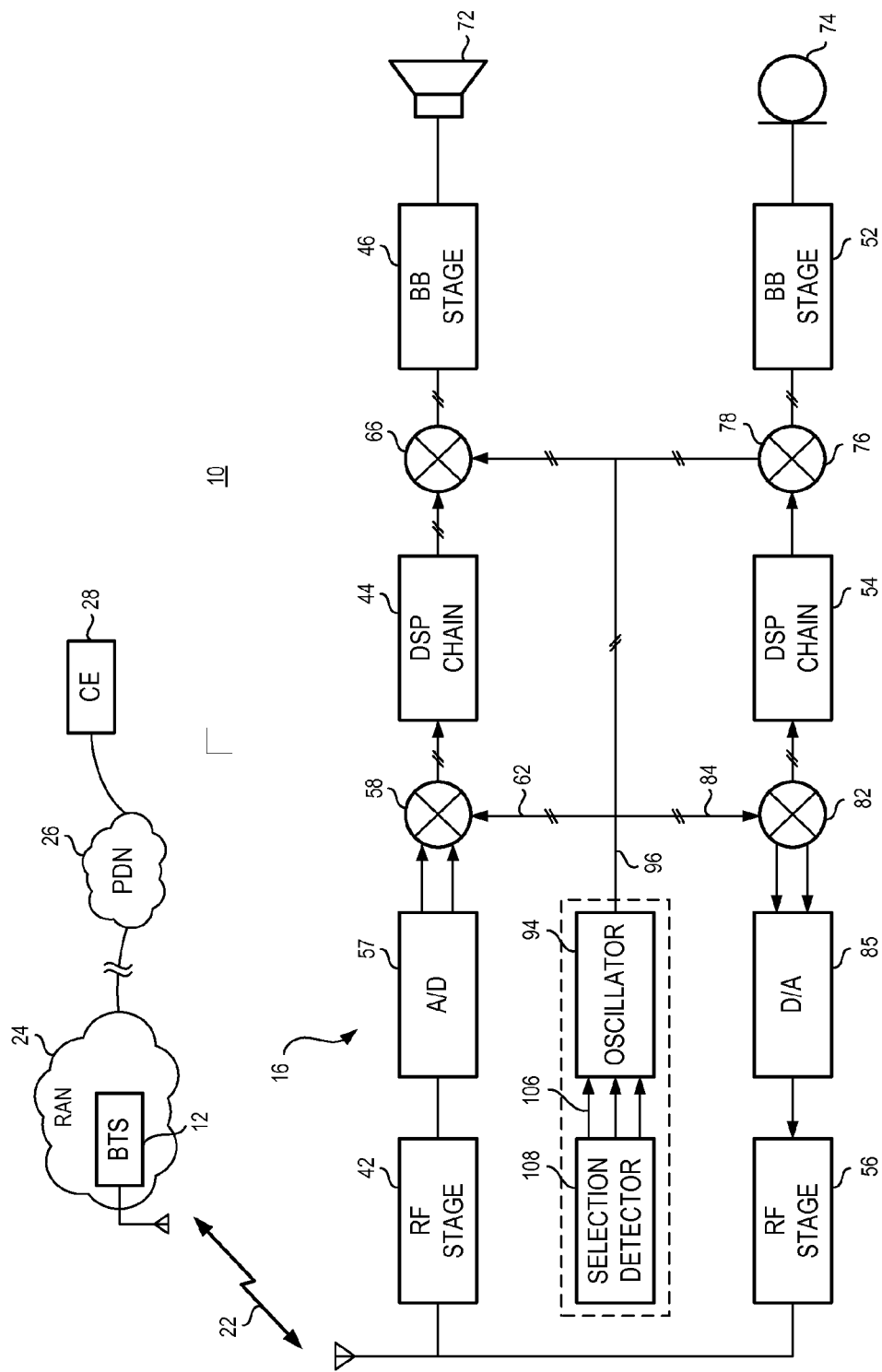
FIG. 1 illustrates a functional block diagram of a communication system in which an implementation of the present disclosure is operable.

The present disclosure, accordingly, advantageously provides an apparatus, and an associated method, by which to synthesize an oscillating signal having selectable frequency, gain, or phase characteristics.

Through operation of an implementation of the present disclosure, a manner is provided by which to synthesize the oscillating signal and mix the synthesized signal with an information signal.

In one aspect of the present disclosure, the synthesized signal that is generated is of selected frequency, gain, and phase characteristics, dependent upon programmable input values. Mixing of the synthesized signal is performed utilizing only a single multiplication operation to form a mixed signal of desired characteristics through appropriate selection of the programmable input values.

In another aspect of the present disclosure, a linear discrete-time oscillator is provided. The linear discrete-time oscillator forms a discrete-valued, oscillating signal. The oscillating signal that is formed is dependent upon input parameters that are determinative of the gain, phase, and frequency characteristics of the discrete-valued, oscillating signal formed by the oscillator.

In another aspect of the present disclosure, selection of an input parameter is detected. The detected input parameter is utilized in the formation of the oscillating signal. The selection is, for example, a programmed selection, selected to cause the formation of an oscillating signal of desired characteristics or to adjust a phase, gain, or frequency of the oscillating signal.

In another aspect of the present disclosure, the linear, discrete-time oscillator is implemented at a signal processor, and the oscillator is operable in any of various modes, such as a frequency up/down conversion mode, a phase adjustor mode, a frequency up/down converter and gain stage mode, a phase adjustor and gain stage mode, and a frequency up/down converter, gain stage, and phase adjustor mode. The mode of operation is selectable, for instance, through use of, or change of, appropriate input parameters that are provided to the oscillator, determinative of the oscillator output.

In another aspect of the present disclosure, input parameters that are provided and are determinative of characteristics of the created oscillating signal include programmable gain coefficients. The programmable gain coefficients set the frequency of oscillation of the resultant, oscillating signal. The gain coefficients, for instance, comprise a sinusoidal value. The sinusoidal value, is, e.g., a sine value or a cosine value or both the sine and cosine values. The value, or values, set the frequency of oscillation and, hence, determine the frequency characteristic of the oscillating signal.

In another aspect of the present disclosure, the input parameters include programmable initial conditions that set the phase offset of the oscillating signal and, hence, determine the phase of the oscillating signal.

In another aspect of the present disclosure, the input parameters include programmable initial conditions that set the amplitude of oscillation of the oscillating signal. Hence, the initial conditions are determinative of the amplitude characteristics of the oscillating signal.

In another aspect of the present disclosure, the linear discrete-time oscillator is resettable. A self-resetting mechanism, e.g., is provided that automatically resets the oscillator. By resetting the oscillator, the oscillator is restarted at any desired, arbitrary state. Resetting occurs, if desired, at a selected rate or periodic interval. In one implementation, the oscillator is caused to automatically reset every T stable seconds. Resetting occurs on a cycle boundary and without causing any discontinuity and, therefore, does not result in the occurrence of disadvantageous spectral affects.

In another aspect of the present disclosure, registers are provided with state values that are updated at discrete intervals, e.g., at successive times. A register is accessed to obtain a current oscillating-signal value, i.e., a discrete value of the discrete-valued oscillating signal.

In another aspect of the present disclosure, a time-to-phase circuit is provided that enables the oscillator to act as a sinusoidal computer. The oscillator generates a sinusoidal signal, e.g., a signal that is represented by a sine value or a cosine value.

In another aspect of the present disclosure, the oscillating signal is mixed together with an information signal, such as a receive signal or a send signal generated, or received, at a communication device during operation to send or to receive information. Mixing is carried out by a single complex multiplication operation to alter any of the amplitude, frequency, and phase characteristics of the resultant, mixed signal. Thereby, any desired alteration is provided by the single complex multiplication operation. Multiple, separate multiplication operations or stages to adjust the frequency, gain, or phase of the resultant signal are not required.

In another aspect of the present disclosure, an oscillator is initialized at an arbitrary amplitude and phase. An information signal is mixed with the output of the oscillator using one complex multiplier.

In these and other aspects, therefore, an apparatus, and an associated method, is provided for an electronic device. A linear discrete-time oscillator is configured to receive input parameters. The oscillator is configured to form a discrete-valued oscillating signal. Values of the input parameters are determinative of gain, phase, and frequency characteristics of the discrete-valued oscillating signal.

Turning first to FIG. 1, a communication system, shown generally at 10, provides for communications between communication stations, here a base transceiver station (BTS) 12 comprising a network station and a wireless device 16. The wireless device 16 and the base transceiver station 12 communicate by way of radio channels 22 defined upon a radio air interface. The base transceiver station 12 forms part of a radio access network (RAN) of the network portion. The network portion further includes a packet data network (PDN) 26 that is in communication connectivity with the radio access network 24. Communication devices are placed in communication connectivity with the packet data network. The communication endpoint (CE) 28 is representative of a cellular communication system that operates in general conformity with an appropriate operating-standard specification.

The communication system 10 is also representative of other types of radio communication systems and, also, more generally, to any of various communication systems, both wireless and wireline, in which information is communicated between communication stations. While the following description shall describe exemplary operation of an implementation of the present disclosure with respect to the exemplary implementation, operation is analogous with respect to communication systems, and devices therein, implemented in other manners.

The wireless device 16 includes radio transceiver circuitry to provide for communication with another communication station, here the base transceiver station 12. The transceiver formed of the wireless device 16 includes a receive part and a transmit part. The receive part operates to receive and to operate upon information signals received at the device 16. And, the transmit part operates to convert information sourced at the device 16 into a form to permit communication thereof to the base transceiver station 12.

The receive and transmit parts include multiple stages, each of which is defined by the frequency levels of signals operated by the respective stages. In the illustrated implementation, the receive part includes an RF (Radio Frequency) stage 42, an intermediate-frequency DPS (digital signal processor) chain 44, and a baseband (BB) stage 46. Analogously, transmit part of the device 16 includes a baseband (BB) stage 52, an intermediate frequency DSP chain 54, and a radio frequency stage (RF) 56.

Signals received by the receive part are at a radio frequency level, at a frequency substantially corresponding to the frequency of the signal when communicated upon a radio channel to the device 16. An analog-to-digital (A/D) converter 57 converts a received signal into digital form. In-phase and quadrature-phase values are formed. A mixer 58 mixes the radio frequency signal, once digitized, with a mixing signal provided on the line 62 to down-convert the signal to an intermediate frequency for further operation at the DSP chain. And, a mixer 66 mixes DSP-chain-formed values with a mixing signal provided on the lines 68 to down-convert the values to a baseband frequency that is provided to the baseband stage 46. The receive part further includes a transducer, here an acoustic transducer 72 that transduces the received signal, subsequent to operations performed thereon by the various receive stages into human-perceptible form.

Information sourced at a microphone 74, is provided to the baseband stage 52. Operations are performed upon the input signal at the baseband stage, and the baseband signal formed at the baseband stage is provided to a mixer 76. The mixer receives a mixing signal on the line 78 and forms a first up-converted signal that is provided to the DSP chain 54. The first up-converted signal is of an intermediate frequency, and the signal is provided to the DSP chain. The DSP chain 54 operates upon the signal provided thereto and provides DSP-chain-generated values to a mixer 82. The mixer receives a mixing signal on the line 84 and forms a mixed signal that is of a radio frequency. The signal is converted into analog form by a digital-to-analog converter 85, which is applied to the radio frequency stage 56. Once operated upon by the radio frequency stage 56, the signal is ready for communication upon a radio channel.

The wireless device 16 includes an apparatus 92 of an implementation of the present disclosure. The apparatus comprises a resonator formed of a linear discrete-time oscillator 94.

The oscillator 94 is implemented in any desired manner including a hardware implementation, a firmware implementation, a processing circuit having code executable thereat to perform the functions of, and implement, the oscillator.

The oscillator 94 forms a discrete-valued oscillating signal on the line 96. The line 96, and the signal formed thereon, is provided to the lines 62 and 84 that extend to the mixers 58 and 82, respectively, and, the signal formed on the line 96 is provided to the lines 68 and 78 that extend to the mixers 66 and 76, respectively, by way of a divider circuit 102.

The oscillating signal formed on the line 96 by the oscillator 94 is of selectable characteristics that are determined by input parameters, here indicated to be provided to the oscillator by way of the lines 106. The input parameters are detected by a selection detector 108. Through appropriate selection of the input parameters, the oscillating signal formed on the line 96 is of any desired characteristics. And, when used to form a mixing signal at a mixer 58, the characteristics of the oscillating signal forming the mixing signal are selected to cause the resultant, mixed signal to be of desired characteristics.

FIG. 2 again illustrates the apparatus 94 of an implementation of the present disclosure, and which forms a portion of the wireless device 16 shown in FIG. 1. In the implementation illustrated in FIG. 2, the resonator forming the oscillator forms quadrature outputs, i.e., in-phase and quadrature-phase outputs that are in quadrature with one another.

The oscillator is provided initial conditions x1(0) and x2(0). And, the oscillator is further provided with programmable gain coefficients, sin(a) and cos(a). The values are, in the exemplary implementation, externally provided, i.e. selected, and the detection selector 108; here represented by multiple blocks 108, detects the selection of the input parameters.

The apparatus 94 further includes registers 112 and 114, implemented, e.g., as flip flops. The registers are provided with values by multiplexers 116 and 118, respectively. Input parameters detected by the selection detectors are provided to first inputs of the multiplexers 116 and 118. And, specifically, the initial condition x1(0) is provided as a first input to the multiplexer 116, and the initial condition x2(0) is provided at a first input of the multiplexer 118. Second inputs to the multiplexer are related to prior, synthesized values.

A resetter 122 generates reset commands that are provided to the multiplexer 116 and 118. When a reset command is generated and applied to the multiplexers, the initial condition values, provided at the first inputs of the respective multiplexers, are passed by the multiplexers and provided to the respective registers 112 and 114. At other times, the values provided to the second inputs of the multiplexers are instead provided to the registers 112 and 114.

The register values stored at the registers 112 and 114 form the values of the oscillating signal at a discrete time. The output line of the register 112 that contains the register value is also connected to mixers 128 and 132. The mixers mix the register value with programmable gain coefficients that are provided by the selection detectors 108. Specifically, the mixer 128 is provided with a value of cos(a), and the mixer 132 is provided with a value of sin(a).

Similarly, the line extending from the register that contains the register value forms the Q output. The value is also provided to the mixers 136 and 138. The programmable gain coefficients are also provided to the respective mixers. Specifically, a value of cos(a) is provided to the mixer 136, and a value of sin(a) is provided to the mixer 138. Mixed signals formed by the mixer 128 are provided to a summer 146, and mixed signals formed by the mixer 132 are provided to a summer 148.

Mixed signals formed by the mixer 136 are provided to the summer 148, and mixed signals formed by the summer 138 are provided to the summer 146. Summed values formed by the summers 146 and 148 are provided to the second inputs to the multiplexers 116 and 118, respectively. At each incremental, e.g., clocked, interval of operation, the registers register, and provide, discrete values of an oscillating signal. Through appropriate selection of the input parameters, i.e., the programmable gain coefficients and the programmable input conditions, a discrete-valued, oscillating signal, both in-space and in quadrature, is provided.

The values generated by the oscillator are represented mathematically as follows:

$$x1[n+1]=\cos(a)*x1[n]-\sin(a)*x2[n]$$

$$x2[n+1]=\sin(a)*x1[n]+\cos(a)*x2[n]$$

Additionally, the outputs are also represented as:

$$y\_i[n]=x1[n]$$

$$y\_q[n]=x2[n]$$

Figure 2:
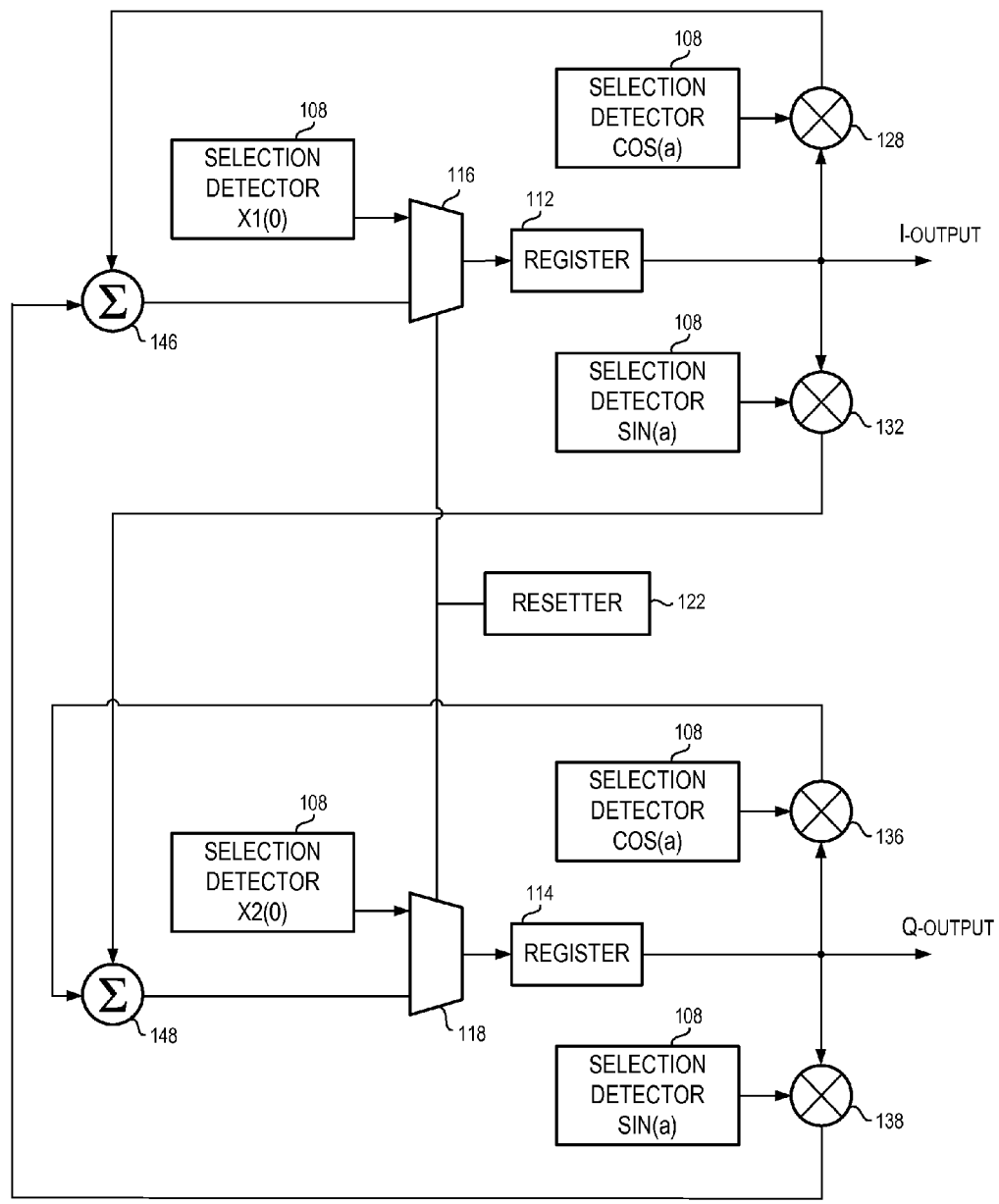
FIG. 2 illustrates a functional block diagram of a direct digital synthesizer (DDS) of an implementation of the present disclosure.
Figure 3:
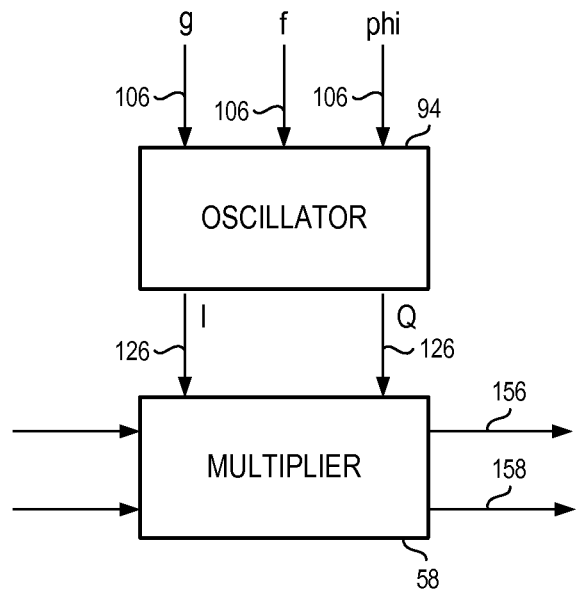
FIG. 3 illustrates a functional block diagram of an implementation of the present disclosure.

FIG. 3 illustrates a functional representation of the oscillator shown in FIG. 2 together with a mixer, here the mixer 58. The oscillator is provided with input parameter values on the lines 106. Here, gain, frequency, and phase (PHI) values are provided. And, the in-phase and quadrature-phase, discrete-values of the oscillating signal are provided on the lines 126.

The mixer 58 is provided with information signals, here both in-phase and quadrature-phase signals. Mixing is performed by multiplying the signals. Through use of the input parameters that are determinative of the gain, frequency, and phase of the oscillating signal, appropriate selection of such values permit mixing to be performed with a single, complex multiplication operation for each of the input and quadrature-components of the input signal. Mixed in-phase and quadrature-phase signals are generated on the lines 156 and 158. That is to say, the oscillator 94 is initialized with the values provided on the lines 106, and the I and Q oscillating signal values are multiplied by the multiplier with the information signals in a single multiplication operation.

In one exemplary implementation, one Hz resolution is provided using a fifty-two MHz clock. Oscillation is provided to produce an accurate sinusoid for a desired period, e.g., one second. Any frequency between one Hz and 25,999,999 Hz can be generated, in steps of one Hz. A reset is caused, e.g., to occur every second. As the frequency, f, is a multiple of one Hz, there is an integer number of cycles every second, which aligns on a clock cycle boundary. And, e.g., for a 200 kHz sinusoid, 260 clock cycles corresponds to one complete wave form. And, in general for 1/n Hz resolution, the oscillator is caused to be stable for n seconds. That is to say, the oscillator produces an accurate sinusoid over a range of desired frequencies for a designated time period, T stable. And, the self-resetting mechanism formed of the resetter operates to auto-reset every T stable seconds. As the resetting occurs on a cycle boundary, there is no discontinuity, and no spectral affects occur.

Figure 4:
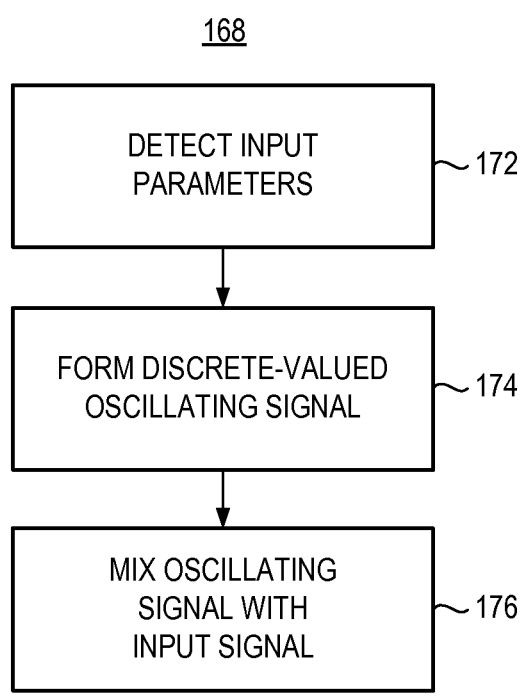
FIG. 4 illustrates a method flow diagram representative of the method of operation of an implementation of the present disclosure.

FIG. 4 illustrates a method flow diagram 168 representative of the method of operation of an implementation of the present disclosure. The method facilitates operation of an electronic device.

First, and as indicated by block 172, input parameters are detected. Then, a discrete-valued oscillating signal is formed, indicated by the block 172. Values of the detected input parameters are determinative of the gain, phase, and frequency characteristics of the discrete-valued oscillating signal.

Then, and as indicated by the block 176, the discrete-valued oscillating signal is mixed with an input signal. The mixing is performed using a single complex multiplication operation.

Thereby, a manner is provided by which to generate a discrete-valued, oscillating signal that is of selectable phase, gain, and frequency characteristics. The discrete-valued, oscillating signal is combinable with an information signal to form a mixed signal of desired characteristics using a single, complex multiplication operation. The conventional use of multiple multiplication operations or stages change the frequency, gain, and phase of the signal, is obviated. Improved efficiency and reduction in the dimensional requirements of circuitry used to perform the multiplication is thereby provided.

Presently preferred implementations of the disclosure and many of improvements and advantages thereof have been described with a degree of particularity. The description is of preferred examples of implementing the disclosure, and the description of examples is not necessarily intended to limit the scope of the disclosure. The scope of the disclosure is defined by the following claims.

What is claimed is:

1. An apparatus for an electronic device, said apparatus comprising:
   a selection detector configured to detect selection of input parameters, the input parameters comprising a set of sinusoidal parameters; and
   a linear discrete-time oscillator configured to receive the plurality of input parameters whose selection is detected by said selection detector, said linear discrete-time oscillator configured to form a discrete-valued oscillating output signal, values of the plurality of input parameters being correspondingly determinative of at least gain, phase, and frequency characteristics of the discrete-valued oscillating output signal.

2. The apparatus of claim 1 further comprising a single multiplier stage configured to receive the discrete-valued oscillating signal formed by said linear discrete-time oscillator and configured to receive an input signal and to form an output signal comprised of a complex product of the input signal and the discrete-valued oscillating signal.

3. The apparatus of claim 1 wherein said linear discrete-time oscillator is configured to form a set of discrete-valued oscillating signals.

4. The apparatus of claim 3 wherein said linear discrete-time oscillator is configured to form a set of linear, second-order discrete-valued oscillating signals.

5. The apparatus of claim 1 wherein said linear discrete-time oscillator comprises a linear, second order discrete-time oscillator.

6. The apparatus of claim 1 wherein the input parameters that said linear discrete-time oscillator is configured to receive comprises a programmable gain coefficient.

7. The apparatus of claim 6 wherein the programmable gain coefficient comprises a sinusoidal value.

8. The apparatus of claim 1 wherein the input parameters that said linear discrete-time oscillator is configured to receive comprise a programmable initial condition value.

9. The apparatus of claim 8 wherein the programmable initial condition value comprises a phase offset value.

10. The apparatus of claim 8 wherein the programmable initial condition value comprises an amplitude value.

11. The apparatus of claim 1 further comprising a selection detector configured to detect selection of the input parameters and wherein the input parameters received by said linear discrete-time oscillator comprise the input parameters whose selection are detected by said selection detector.

12. An apparatus for an electronic device, said apparatus comprising:
   a linear discrete-time oscillator configured to receive a plurality of input parameters and configured to form a discrete-valued oscillating output signal, the input parameters comprising a set of sinusoidal parameters, values of the plurality of input parameters being correspondingly determinative of at least gain, phase, and frequency characteristics of the discrete-valued oscillating output signal; and
   a self resetter configured to reset said linear discrete-time oscillator.

13. An apparatus for an electronic device, said apparatus comprising:
   a linear discrete-time oscillator configured to receive a plurality of input parameters and configured to form a discrete-valued oscillating output signal, the input parameters comprising a set of sinusoidal parameters, values of the plurality of input parameters being correspondingly determinative of at least gain, phase, and frequency characteristics of the discrete-valued oscillating output signal, said linear discrete-time oscillator comprising a state register provided with a discrete value of the oscillating output signal.

14. A method for facilitating operation of an electronic device, said method comprising:
   detecting selection of a plurality of input parameters, the plurality of input parameters comprising a set of sinusoidal parameters; and
   forming a discrete-valued oscillating output signal with the plurality of input parameters whose selection is detected during said selecting, values of the plurality of input parameters being correspondingly determinative of at least gain, phase, and frequency characteristics of the discrete-valued oscillating output signal.

15. The method of claim 14 further comprising mixing the discrete-valued oscillating signal with an input signal using a single complex multiplication operation.

16. The method of claim 14 wherein said forming the discrete-valued oscillating signal comprises forming a set of linear, second-order, discrete-valued oscillating signals.

17. The method of claim 14 wherein said detecting input parameters comprises detecting a programmable initial condition value.

18. The method of claim 14 wherein said detecting input parameters comprises detecting a programmable gain coefficient.

19. An apparatus for acting upon an input communication signal at a communication device, said apparatus comprising:
   a linear discrete-time oscillator configured to receive a plurality of input parameters, the plurality of input parameters comprising a set of sinusoidal parameters, and said linear discrete-time oscillator configured to form a discrete-valued oscillating output signal, values of the plurality of input parameters being correspondingly determinative of at least gain, phase, and frequency characteristics of the discrete-valued oscillating output signal;
   a mode-selection detector configured to select an input communication signal adjustment mode; and
   a single complex multiplier configured to multiply the input communication signal by the discrete-valued oscillating output signal to form an output signal, the input communication signal adjusted, by a single complex multiplication to change any of: a phase characteristic, a gain characteristic, and a frequency characteristic.

* * * * *